May 31, 1949. K. WILLIAMS 2,472,035
COMBINED SPRING AND FRICTION SHOCK ABSORBERS
Filed Aug. 19, 1946 2 Sheets-Sheet 2

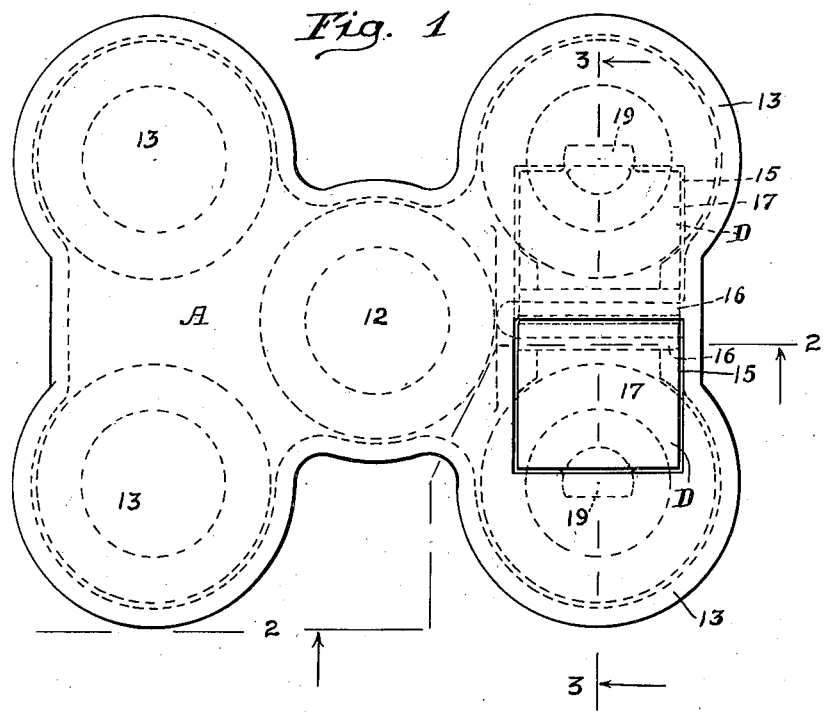
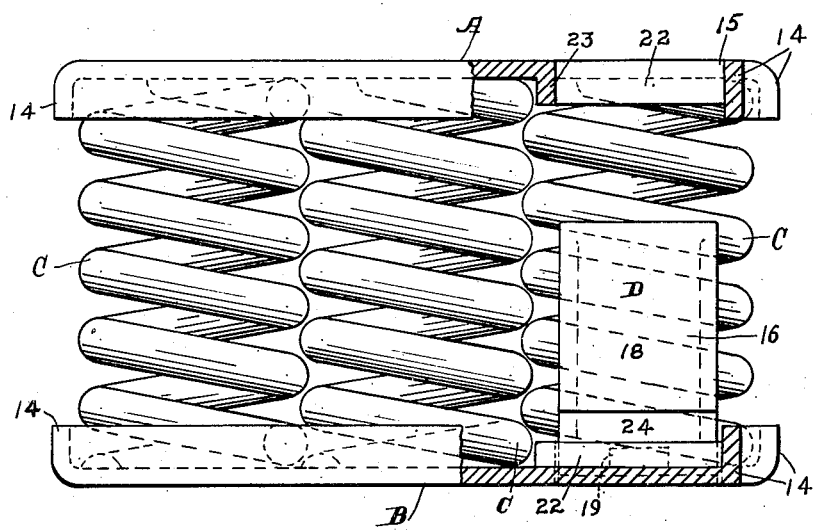

Inventor:
Keith Williams
By George D. Haight
Atty.

Patented May 31, 1949

2,472,035

UNITED STATES PATENT OFFICE 2,472,035

COMBINED SPRING AND FRICTION SHOCK ABSORBER

Keith Williams, Buffalo, N. Y.

Application August 19, 1946, Serial No. 691,582

4 Claims. (Cl. 267—9)

This invention relates to improvements in combined spring and friction shock absorbers, especially adapted for use in connection with railway car trucks.

One object of the invention is to provide simple and efficient means for snubbing the action of truck springs of railway cars, comprising a pair of relatively slidable friction elements held in frictional contact with each other by the action of certain springs of the truck spring cluster.

A further object of the invention is to provide means for snubbing the action of the springs of a truck spring cluster, comprising a pair of relatively slidable friction elements, tiltable toward each other, and held in contact with each other by the expansive action of certain spring members of the cluster, wherein the friction elements have base portions on which the springs act to rock the elements toward each other, and wherein the base portions are accommodated in openings or recesses extending through the usual spring follower plates of the cluster and have fulcrum means bearing directly on the spring plates to support the base portions free of the cooperating parts of the truck structure on which the spring plates bear, thus preventing the base portions from digging into and damaging the same.

Other objects of the invention will more clearly appear from the description and claims hereinafter following.

Figure 3:
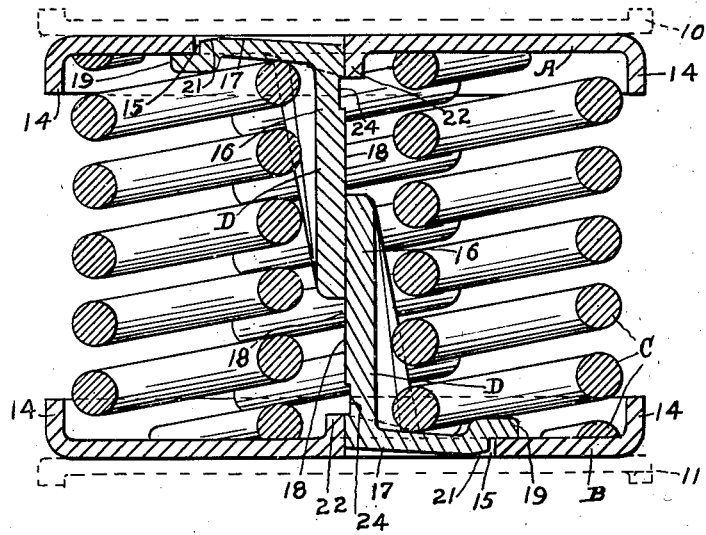
Figure 4:
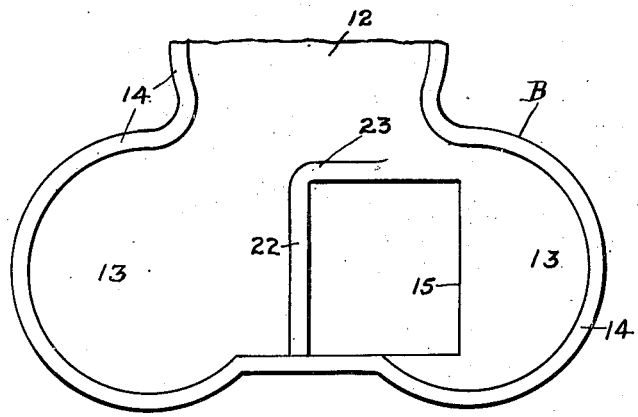
Figure 5:
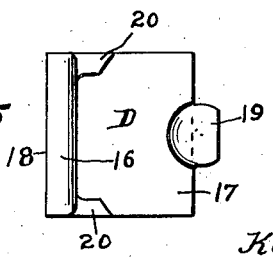

In the accompanying drawings, forming a part of this specification, Fig. 1 is a top plan view of my combined spring and friction shock absorber; Fig. 2 is a vertical sectional view, corresponding substantially to the offset line 2—2 of Fig. 1, with the upper friction element omitted and showing the device partly in side elevation; Fig. 3 is a vertical sectional view, corresponding substantially to the line 3—3 of Fig. 1; Fig. 4 is a broken plan view of the lower spring follower plate of the combined spring and friction shock absorber, as shown in Fig. 3; and Fig. 5 is a top plan view of the lower friction element of the combined spring and friction shock absorber.

In said drawings, referring more particularly to Figs. 2 and 3, 10 indicates the truck bolster and 11 the spring plank of the truck of a railway car, to which my improvements are applied, the combined spring and friction shock absorber being interposed between said truck bolster and spring plank.

As shown in the drawings, my improved combined spring and friction shock absorber comprises broadly top and bottom spring plates A and B, five springs C—C—C—C—C, and a pair of friction elements D—D.

The top and bottom spring plates A and B are of similar design, each plate being of the outline shown in Fig. 1 and comprising a central portion 12 and spaced winglike side portions 13—13 extending in a direction transverse to said central portion. At the outer edge, each plate is provided with a right angular flange 14, which is continuous along the periphery of the plate. The flange of the plate A projects downwardly and that of the plate B projects upwardly. The peripheral edges of the plates A and B and the flanges 14—14 are suitably rounded to fit the contour of the coil springs C of the five-spring cluster and hold the same properly centered.

The right-hand wing 13 of each plate A and B, as seen in Figs. 1 and 2, is provided with a substantially rectangular opening or recess 15 therethrough, adapted to accommodate the base portion of one of the friction elements D. The openings or recesses 15—15 of the top and bottom plates are respectively located at opposite sides of a vertical plane coincident with the vertical central axis of the mechanism and extending transversely with respect to the wings 13—13 of said plates. The plates A and B are exact duplicates, being reversely arranged, the plate A facing downwardly and the plate B facing upwardly.

The five springs C preferably correspond in size and capacity to the springs of a standard five-unit truck spring cluster of a railway car truck, and in actual practice standard spring units are employed which are grouped in the usual manner and have their top and bottom ends bearing respectively on the spring plates A and B.

The friction elements D—D are of like design, each being in the form of a casting comprising a postlike plate member 16 having a laterally projecting base flange or foot 17 at one end thereof. On its inner side, the plate member 16 of each element D presents a relatively wide, flat friction surface 18. As will be seen upon reference to Figs. 1, 3, and 5, the projecting base flange or foot 17 extends from the side of the friction element opposite to the friction surface 18 thereof. The angle between the friction surface 18 and the bottom face of the flange or foot 17 is slightly in excess of a right angle, as clearly shown in Fig. 3, whereby the foot or base flange is slightly inclined to the horizontal when the parts are assembled. At its outer end, the flange or foot 17 is provided with a relatively narrow fulcrum lip 19 adapted to engage over and bear on the corresponding follower plate A or B to provide for rocking movement of the friction element. The lip 19 of the lower friction element is offset upwardly and that of the upper friction element is offset downwardly to engage over the corresponding follower plate. On the outer or flanged side thereof, the plate member 16 of each friction element has spaced, vertically extending ribs 20—20 at opposite side edges thereof, which taper toward the free end of the plate member. The inner edges of the ribs 20—20 of each friction element are cut out concavely, as shown, to clear the coil spring C with which the particular friction element cooperates.

The two friction elements D—D of the shock absorber have the friction surfaces 18—18 thereof in flat engagement and said elements are reversely arranged end for end, that is, with the flange or foot 17 of one element D at the bottom of the mechanism and the flange or foot 17 of the other element D at the top of the mechanism. The flanges 17—17 of the two friction elements are respectively engaged within the openings 15—15 of the plates A and B with the lips 19—19 thereof engaging over the plates at said openings. Each flange or foot 17 is of square outline to fit the corresponding opening 15, but sufficient space is provided between said flange and the side and end walls of the opening to allow the flange to have relatively free rocking movement within said opening. The lip 19 of each friction element fulcrums on the corresponding spring plate and supports the foot or base flange 17 free of the spring plank or bolster on which the spring plate bears, the outer lower edge corner of the flange or foot being preferably cut away, as indicated at 21, to assure such clearance. To prevent possible displacement of the base flanges of the friction elements D—D with respect to the openings or recesses 15—15, each spring plate is provided with guide flanges 22 and 23 at the opening 15. The flange 14 of the spring plate forms a guide member at one side of the opening or recess, while the flange 23 forms a parallel guide member at the opposite side, and the flange 22 forms a guide member at the inner end of the recess extending from the flange 14 to the flange 23.

The two springs C—C at the right-hand side of the combined spring and friction shock absorber, as viewed in Figs. 1 and 2, overlap the flanges or foot members 17—17 of the friction elements D—D, one spring overlapping the foot of the upper friction element and surrounding the offset lip 19 thereof, and the other spring overlapping the foot of the lower friction element and surrounding the offset lip of the latter. As will be evident, the base flanges or foot members 17—17 of the two friction elements D—D are thus subjected to the pressure of the springs and the tendency is to rock the friction elements toward each other to press the friction surfaces thereof into tight frictional contact.

The top and bottom spring plates A and B bear respectively on the underneath surface of the truck bolster 10 and the top of the spring plank 11. The friction elements D—D which fulcrum on the spring plates are held in position with their base flanges or foot members 17—17 engaged in the openings or recesses 15—15 but clear of the bolster and the spring plank. The plate member 16 of each friction element D is of lesser height than the vertical distance between the spring plates A and B at the time that the springs C are in the expanded position shown in Figs. 2 and 3. The upper end of the lower friction element and the lower end of the upper friction element are thus normally spaced from the flanges 22—22 of the top and bottom spring plates respectively. The clearance thus provided is sufficient to permit the required compression of the springs C in service. Engagement of the friction elements with the respective flanges 22—22 serves to limit compression of the mechanism and prevent the springs from being unduly compressed. To protect the friction surfaces 18—18 of the elements D—D from being marred by the edges of these elements, each element is transversely grooved at the inner end of the friction surface thereof, as indicated at 24, thereby providing an abrupt shoulder at the end of the friction surface, which shoulder is over-ridden by the end of the plate member of the cooperating friction element when the mechanism is fully compressed.

The operation of my improved combined spring and friction shock absorber is as follows: Upon relative approach of the spring plank and truck bolster, the coils of the group or cluster of springs C are compressed between the spring plates A and B. At the same time, the friction elements D—D having the lips 19—19 thereof in shouldered engagement with these spring plates are forced to slide relatively lengthwise with respect to each other. Friction snubbing action is thus produced during compression of the springs. During recoil of the springs, the friction elements are returned to the normal position shown in Figs. 2 and 3, the same being moved apart or away from each other by the action of the springs on the flanges or foot members 17—17 thereof. The recoiling action of the springs is dampened or snubbed by the friction elements D—D which are held in tight frictional engagement with each other through the pressure of the springs on the flanges or foot members of said elements.

I claim:

1. In a shock absorber, the combination with a pair of follower plates relatively movable toward each other, each plate having a recess therein; of a pair of relatively movable friction elements in lengthwise sliding frictional contact with each other, each of said elements having a base flange at one end thereof, said elements being interposed between said follower plates with the base flanges thereof accommodated in the recesses of said plates respectively; a fulcrum lip at the outer end of the base flange of each element protruding from the recess of the corresponding plate over the inner side of said plate and having rocking bearing engagement with the latter; and spring means interposed between said plates and having bearing engagement with said flanges of said elements respectively for pressing the latter into tight frictional contact.

2. In a shock absorber, the combination with top and bottom follower plates relatively movable toward and away from each other, each plate having an opening therein extending entirely therethrough; of top and bottom relatively movable friction elements in lengthwise sliding frictional contact with each other; a laterally projecting base flange at the upper end of said top element accommodated in the opening of the top plate; a laterally projecting base flange at the lower end of said bottom element accommodated in the opening of the bottom plate; a fulcrum lip projecting from the outer end of the flange of each element, the fulcrum lip of said top element being offset downwardly with respect to the flange thereof and engaging the underneath side of said top plate to rock thereon, and the fulcrum lip of said bottom element being offset upwardly with respect to the flange thereof and engaging the top of said bottom plate to rock thereon; and spring means interposed between said plates and having bearing engagement with said base flanges of said elements for rocking both of said elements on their fulcrum lips and pressing said elements into tight frictional contact.

3. In a shock absorber interposed between two relatively movable members to yieldingly resist relative approach thereof, the combination with opposed spring plates bearing on said members respectively, each plate having a recess extending therethrough; of a pair of friction elements in lengthwise sliding engagement with each other, said element having a rocker base portion integral therewith, said base portions being accommodated in the recesses of said plates respectively; a fulcrum lip projecting from the outer end of the base portion of each element and engaging the inner side of the corresponding plate adjacent the recess thereof to rock thereon and support said base portion clear of the corresponding member on which the plate bears; and springs interposed between and engaging said plates to yieldingly oppose relative approach thereof, one of said springs overlapping the base portion of one of said elements and another of said springs overlapping the base portion of the other of said elements to rock said elements on their fulcrum lips into tight frictional engagement with each other.

4. In a shock absorber, the combination with top and bottom spring plates relatively movable toward and away from each other; of a group of coil springs interposed between said spring plates and yieldingly opposing relative approach thereof; upper and lower interengaging friction elements, said upper friction element having a flangelike foot member at its upper end and said lower element having a flangelike foot member at its lower end, said friction elements being disposed between two adjacent springs of said group, said plates having openings therethrough in which the flangelike foot members of said elements are accommodated; and a fulcrum lip on the foot member of each element bearing on the corresponding spring plate supporting said element for rocking movement, one of said two adjacent springs having the upper end thereof bearing on the foot member of the upper element and the other of said two springs having the lower end thereof bearing on the foot member of the lower element for rocking said elements toward each other and pressing the same into tight frictional contact.

KEITH WILLIAMS.

REFERENCES CITED

The following references are of record in the file of this patent:

UNITED STATES PATENTS

| Number | Name | Date |
| --- | --- | --- |
| 882,279 | Washburn | Mar. 17, 1908 |
| 2,143,154 | Johnson | Jan. 10, 1939 |
| 2,199,339 | Hall | Apr. 30, 1940 |
| 2,238,227 | Lounsbury | Apr. 15, 1941 |
| 2,321,487 | Horn | June 8, 1943 |
| 2,386,895 | Haseltine | Oct. 16, 1945 |
| 2,410,160 | Haseltine | Oct. 29, 1946 |